(12) United States Patent
Brigham et al.

(10) Patent No.: US 7,506,000 B2
(45) Date of Patent: *Mar. 17, 2009

(54) METHOD AND SYSTEM FOR PROGRAMMING DISCONNECTED DATA

(75) Inventors: Robert A. Brigham, Woodinville, WA (US); Giovanni M. Della-Libera, Seattle, WA (US); Patrick M. Dengler, Redmond, WA (US); Paul S. Kuklinski, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/196,360

(22) Filed: Aug. 2, 2005

(65) Prior Publication Data

US 2005/0267906 A1 Dec. 1, 2005

Related U.S. Application Data

(63) Continuation of application No. 09/734,421, filed on Dec. 11, 2000, now Pat. No. 6,970,887.

(51) Int. Cl.
*G06F 17/00* (2006.01)
(52) U.S. Cl. .................... 707/104.1; 707/100; 707/101; 707/102; 707/103 R
(58) Field of Classification Search .............. 707/104.1, 707/100–102, 103 R
See application file for complete search history.

(56) References Cited

U.S. PATENT DOCUMENTS

| | | | | | |
|---|---|---|---|---|---|
| 5,668,987 | A | * | 9/1997 | Schneider | 707/3 |
| 5,870,759 | A | * | 2/1999 | Bauer et al. | 707/201 |
| 6,044,216 | A | * | 3/2000 | Bhargava et al. | 717/114 |
| 6,411,967 | B1 | * | 6/2002 | Van Renesse | 707/201 |
| 6,430,527 | B1 | * | 8/2002 | Waters et al. | 703/3 |
| 6,970,887 | B1 | * | 11/2005 | Brigham et al. | 707/104.1 |

* cited by examiner

*Primary Examiner*—Sana Al-Hashemi
(74) *Attorney, Agent, or Firm*—Merchant & Gould P.C.

(57) ABSTRACT

A method of tracking data through a multi-tier computing architecture includes initializing a first row pointer of a dataset with data form a database, placing changes to the data in the second row pointer of the dataset, comparing the first and second row pointers, and declaring a state of the data in response to comparing the first and second row pointers. A system for tracking data through a multi-tier architecture includes an initialize module, a change module, a compare module, and a declare module. The initialize module initializes a first row pointer of a dataset with data from a database. The change module places changes to the data in a second row pointer of the dataset. The compare module compares the first and second row pointers. The declare module declares a state of the data in response to comparing the first and second row pointers.

15 Claims, 6 Drawing Sheets

METHOD AND SYSTEM FOR PROGRAMMING DISCONNECTED DATA

RELATED APPLICATION

This application is a continuation of U.S. patent application Ser. No. 09/734,421, filed on Dec. 11, 2000 and entitled "Method and System for Programming Disconnected Data," the entirety of which is hereby incorporated by reference.

TECHNICAL FIELD

The present invention relates to programming disconnected data and more particularly to tracking changes to data through a multi-tier architecture.

BACKGROUND

In some instances, a client manipulating a database is directly connected to the database and maintains that connection during manipulation of the data. This type of architecture allows for data synchronization between the client and the database. However, this type of computer architecture places limits on the number of clients that might work with the database at any one time; or in other words, this architecture is not scalable. In other data structure architectures, a multi-tier architecture, such as a three-tier architecture, is used. The client comprises the first tier. The second tier includes servers that contain the business logic while the third tier contains the database or multiple databases.

In the multi-tier architecture, the client makes a request to the second tier for data. A server in the second tier pulls the data from the database in the third tier and sends a snapshot of the data to the client. The client can make changes to the data, such as update the data, add data, or delete data. The changes are sent back to the second tier. Upon return of the data from the client, the client request may or may not be routed to the same server that sent the data to the client originally.

The three-tier approach has disadvantages. One such disadvantage is that scalability is limited. In the case where the client request is returned to the same server each time to track data, load balancing is not optimized. In the case where the client request is not returned to the same server each time, making sure all of the data in all of the tiers is synchronized is difficult.

SUMMARY

In one aspect of the present invention, a method of tracking data through a multi-tier computing architecture is provided. The method includes initializing a first row pointer of a dataset with data form a database, placing changes to the data in the second row pointer of the dataset, comparing the first and second row pointers, and declaring a state of the data in response to comparing the first and second row pointers.

In another aspect of the present invention, a computer program product readable by a computing system and encoding instructions for a computer process for tracking data through a multi-tier computing architecture is provided. The computer process comprises instructions analogous to that described above.

In another aspect of the present invention, a system for tracking data through a multi-tier architecture is provided. The system includes an initialize module, a change module, a compare module, and a declare module. The initialize module initializes a first row pointer of a dataset with data from a database. The change module places changes to the data in a second row pointer of the dataset. The compare module compares the first and second row pointers. The declare module declares a state of the data in response to comparing the first and second row pointers.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, that are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes methods and systems for programming disconnected data. Diffgrams, messages, or datasets are used to track changes to the snapshots of data as the snapshots move through the different tiers of a multi-tier computing architecture. Preferably, the dataset includes two row pointers for a block of data. The first row pointer is called the original row. The second row pointer is called the current row. By comparing the two row pointers, or the current to the original, the current state of the data can be determined as original, new, updated, or deleted. Thus, the data can be synchronized and tracked across the tiers of a multi-tier architecture.

Figure 1:
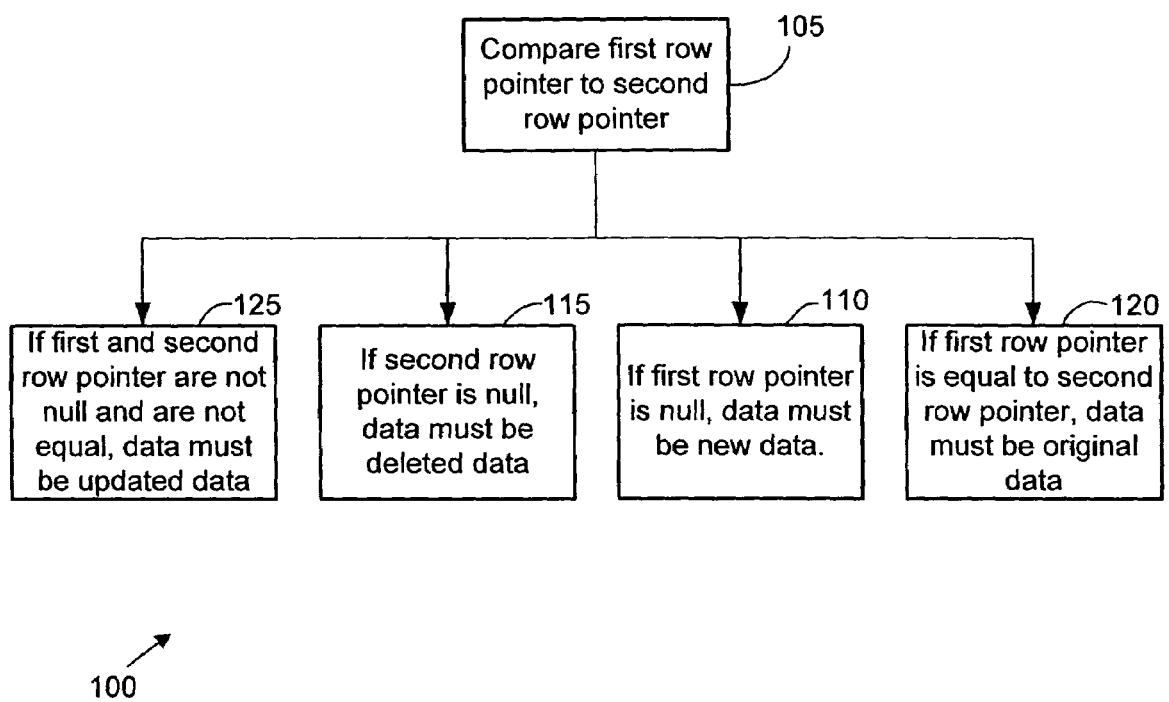
FIG. 1 is a schematic representation of methods and systems for programming disconnected data, according to an example embodiment of the present invention.

Referring now to FIG. 1, a schematic representation of a disconnected programming model 100 is illustrated. A dataset is created for a block of data that is to be transferred through a multi-tier computing architecture. Each dataset includes first and second row pointers. Initialized data is placed in the first row pointer of the dataset. Changes to the data are placed in the second row pointer of the dataset. A compare module 105 compares the first row pointer to the second row pointer to determine the state of the data.

If the compare module 105 determines that the first row pointer is null, the data must be new data at block 110. Because upon initialization the data is placed in the first row pointer, if the first row pointer is empty, the data did not exist at is initialization; therefore, the data must be new data. If the compare module 105 determines that the second row pointer is null, the data must be deleted data at block 115. Because the second row pointer, or current row pointer, is empty, the data must have been deleted; therefore, the data must be deleted data.

If the compare module 105 determines that the first and second row pointers are equal, the data must be the original data at block 120. Because the second row pointer tracks changes to the data, if the second row pointer equals the first row pointer, the data must be the original data. If the compare module 105 determines that the first and second row pointers are not equal, the data must be updated data at block 125. Because the second row pointer tracks changes to the data, if the second row pointer is not equal to the first row pointer, the data must be updated data.

Figure 2:
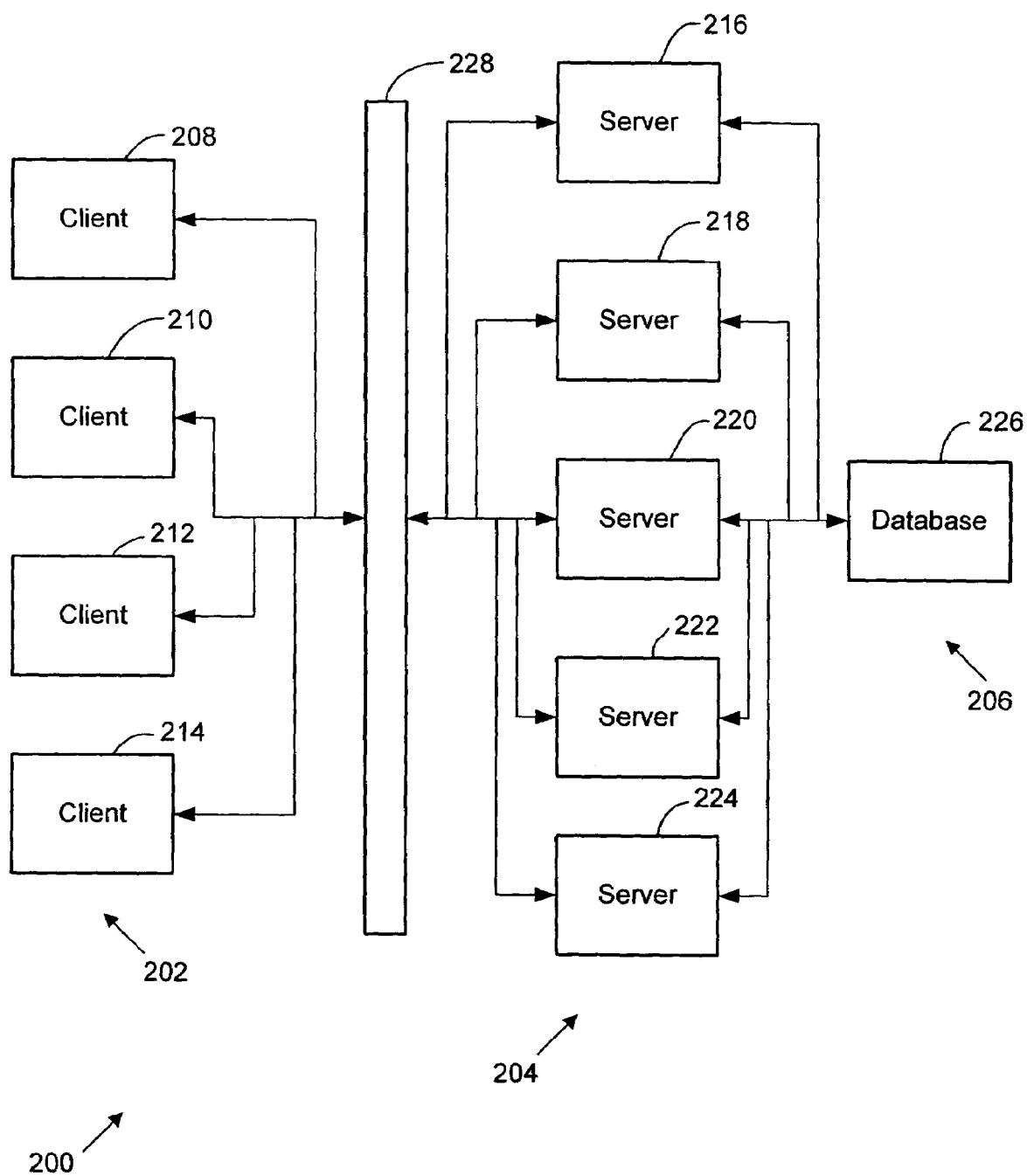
FIG. 2 is a schematic representation of a multi-tier architecture that may be used to implement aspects of the present invention.

Referring now to FIG. 2, an exemplary environment 200 for implementing embodiments of the present invention includes a multi-tier architecture comprising a client tier 202, a server tier 204, and a database tier 206. This multi-tier architecture is common, for example, in applications related to the World Wide Web or Internet. The client tier 202, the server tier 204, and the database tier 206 might contain any number of computing systems, for example, a computing system 300 as described in connection with FIG. 3. In the embodiment illustrated in FIG. 2, the client tier 202 includes a plurality of client computing systems 208, 210, 212, 214. Likewise, the server tier 204 includes a plurality of server computing systems 216, 218, 220, 222, 224. The database tier 206 includes a database 226. Of course, the database tier 206 could also contain multiple databases. This exemplary environment is commonly referred to as a three-tier architecture.

In this three-tier architecture, the database tier 206 is the ultimate repository of information or data. The client tier 202 provides the user-interface logic for interfacing with a user of the three-tier architecture. The server tier 204 typically contains the business rules and controls the interface between the client tier 202 and the database tier 206. The client tier 202 typically interacts with the server tier 204, which in turn interacts with the database tier 206 to update the database 226 and retrieve data from the database.

Many users can interface with the server tier 204 simultaneously through a router 228. As stated previously, the client tier 202 might contain several, thousands, or millions of client computing systems 208, 210, 212, 214, for example a web browser or a rich client. All of these computing systems 208, 210, 212, 214 interact with the router 228 sending requests to the server tier 204 for information and receiving information back from the server tier 204. For example, the client computing system 208 might request a list of books for sale from the server tier 204. The client computing system 208 sends the request to the router 228. The router 228 routes the request to a server computing system, such as the server computing system 216, for example a web server or network server. The router 228 might be a dumb router or a smart router as is commonly known. Preferably, the router 228 routes the client requests based on load. In other words, the router 228 determines which server computing system 216, 218, 220, 222, 224 in the server tier 204 has the most capacity available at the time of the request.

The server computing system 216 receives the request from the client computing system 208, through the router 228, and accesses the database 226 to retrieve the requested information. The database 226 sends the requested information to the server computing system 216. The server computing system 216 processes or formats the information and returns the resulting information to the client computing system 208 through the router 228 for use by the user. As the number of requests to the server tier 204 increases, more server computing systems can be added to the server tier 204. Thus, the multi-tier architecture is scalable.

Figure 3:
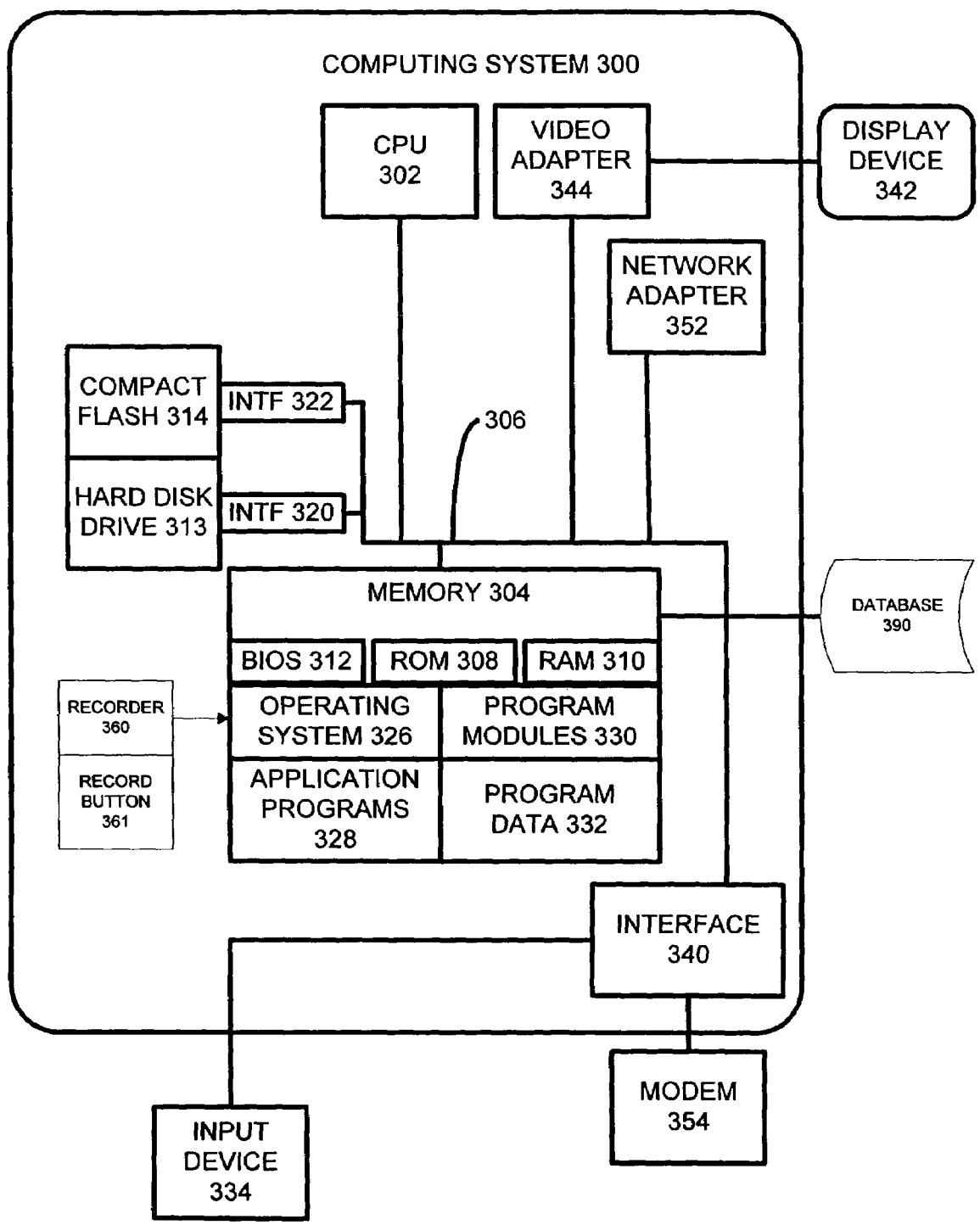
FIG. 3 is a schematic representation of a computing system that may be used to implement aspects of the present invention.

Referring now to FIG. 3, an exemplary environment for implementing embodiments of the present invention includes a general purpose computing device in the form of a computing system 300, including at least one processing system 302. Such a computing system 300 might be used in the client tier 202, the server tier 204, and/or the database tier 206 of the multi-tier architecture 200 described above.

A variety of processing units are available from a variety of manufacturers, for example, Intel or Advanced Micro Devices. The computing system 300 also includes a system memory 304, and a system bus 306 that couples various system components including the system memory 304 to the processing unit 302. The system bus 306 might be any of several types of bus structures including a memory bus, or memory controller; a peripheral bus; and a local bus using any of a variety of bus architectures.

Preferably, the system memory 304 includes read only memory (ROM) 308 and random access memory (RAM) 310. A basic input/output system 312 (BIOS), containing the basic routines that help transfer information between elements within the computing system 300, such as during start-up, is typically stored in the ROM 308.

Preferably, the computing system 300 further includes a secondary storage device 313, such as a hard disk drive, for reading from and writing to a hard disk (not shown), and a compact flash card 314.

The hard disk drive 313 and compact flash card 314 are connected to the system bus 306 by a hard disk drive interface 320 and a compact flash card interface 322, respectively. The drives and cards and their associated computer-readable media provide nonvolatile storage of computer readable instructions, data structures, program modules and other data for the computing system 300.

Although the exemplary environment described herein employs a hard disk drive 313 and a compact flash card 314, it should be appreciated by those skilled in the art that other types of computer-readable media, capable of storing data, can be used in the exemplary system. Examples of these other types of computer-readable mediums to include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 313, compact flash card 314, ROM 308, or RAM 310, including an operating system 326, one or more application programs 328, other program modules 330, and program data 332. A user may enter commands and information into the computing system 300 through an input device 334. Examples of input devices might include a keyboard, mouse, microphone, joystick, game pad, satellite dish, scanner, and a telephone. These and other input devices are often connected to the processing unit 302 through an interface 340 that is coupled to the system bus 306. These input devices also might be connected by any number of interfaces, such as a parallel port, serial port, game port, or a universal serial bus (USB). A display device 342, such as a monitor, is also connected to the system bus 306 via an interface, such as a video adapter 344. The display device 342 might be internal or external. In addition to the display device 342, computing systems, in general, typically include other peripheral devices (not shown), such as speakers, printers, and palm devices.

When used in a LAN networking environment, the computing system 300 is connected to the local network through a network interface or adapter 352. When used in a WAN networking environment, such as the Internet, the computing system 300 typically includes a modem 354 or other means, such as a direct connection, for establishing communications over the wide area network. The modem 354, which can be internal or external, is connected to the system bus 306 via the interface 340. In a networked environment, program modules depicted relative to the computing system 300, or portions thereof, may be stored in a remote memory storage device. It will be appreciated that the network connections shown are exemplary and other means of establishing a communications link between the computing systems may be used.

The computing system 300 might also include a recorder 360 connected to the memory 304. The recorder 360 includes a microphone for receiving sound input and is in communication with the memory 304 for buffering and storing the sound input. Preferably, the recorder 360 also includes a record button 361 for activating the microphone and communicating the sound input to the memory 304.

Figure 4:
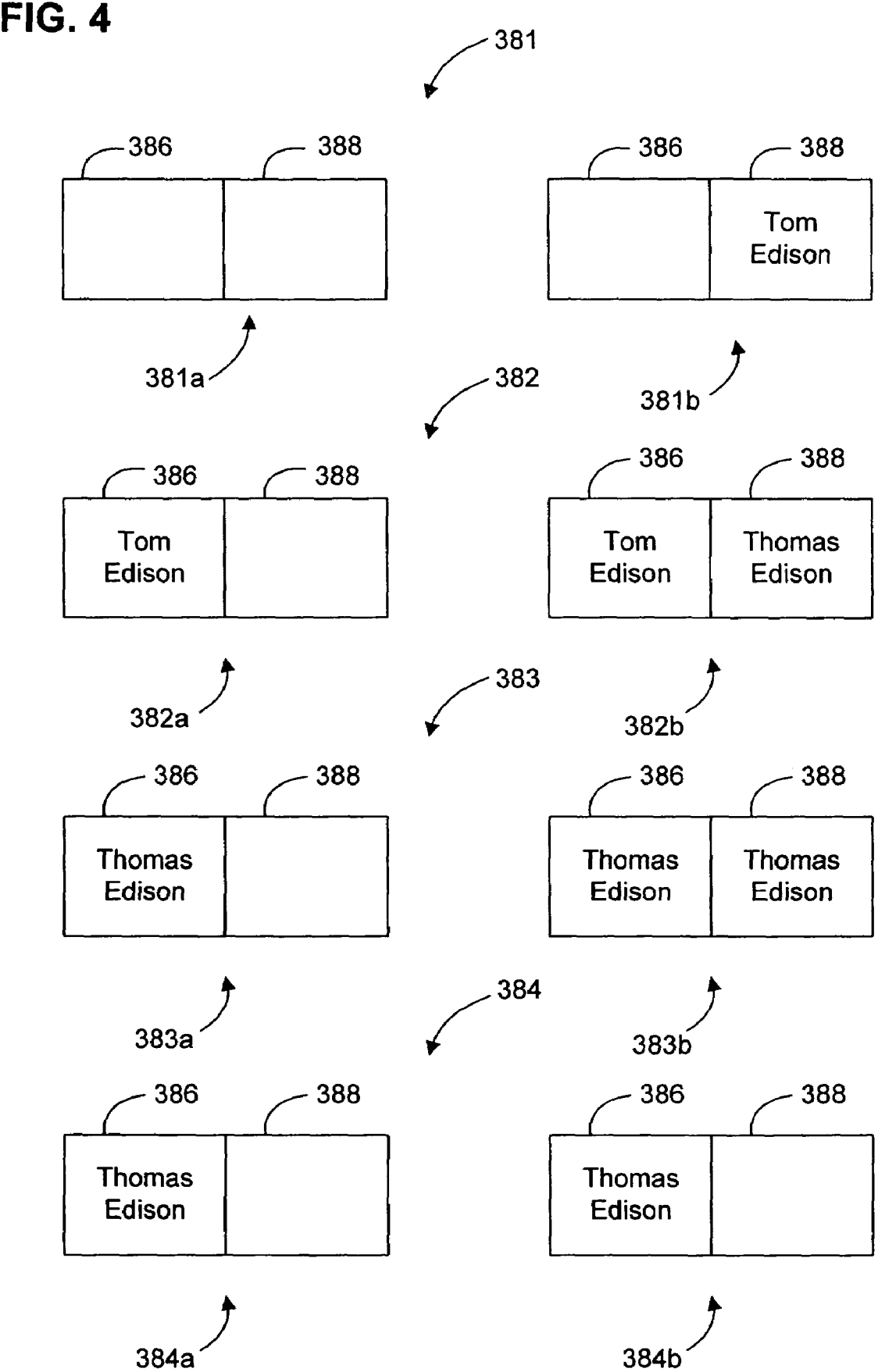
FIG. 4 is a schematic representation of datasets, according to an example embodiment of the present invention.

FIG. 4 is a schematic representation of example first, second, third, and fourth datasets 381, 382, 383, 384. Each dataset 381, 382, 383, 384 has a first row pointer 386 and a second row pointer 388. The first row pointer 386 contains the original data, and the second row pointer 388 contains the current data. By comparing the first and second row pointers 386, 388, the state of the data can be determined as will be described in more detail below.

The first dataset 381 has a sent condition 381a and a received condition 382b. The sent condition 381a represents the first dataset 381 as it was initialized by the server tier 204, FIG. 2, and sent to the client tier 202, FIG. 2. The initialized data is placed in the first row pointer 386 of the sent condition 381a. The second row pointer 388 is reserved for changes made by the client tier 202, FIG. 2. Thus, the second row pointer 388 will be null in the sent condition 381a.

The received condition 381b represents the first dataset 381 as it is received by the server tier 204, FIG. 2, from the client tier 202, FIG. 2. The second row pointer 388 contains the changes made by the client tier 202. The first row pointer 386 remains unchanged as a reflection of the original data sent to the client tier 202 by the sever tier 204. Thus, the first row pointer 386 of the sent condition 381a will equal the first row pointer 386 of the received condition 381b. Likewise, the second, third, and fourth datasets 382, 383, 384 have sent conditions 382a, 383a, 384a, respectively, and received conditions 382b, 383b, 384b, respectively.

In the example embodiment illustrated, referring to the first dataset 381, the first row pointer 386 and second row pointer 388 of the sent condition 381a are null, or empty. The first row pointer 386 is also null in the received condition 381b. The second row pointer 388 contains "Tom Edison," in the received condition 381b. Referring to the second dataset 382, the first row pointer 386 of the sent condition 382a contains "Tom Edison," and the second row pointer 388 of the send condition 382a is null. The first row pointer 386 of the received condition 382b contains "Tom Edison," and the second row pointer 388 of the received condition 382b contains "Thomas Edison."

Referring to the third dataset 383, the first row pointer 386 of the sent condition 383a contains "Thomas Edison," and the second row pointer 388 of the sent condition 383a is null. The first row pointer 386 of the received condition 383b contains "Thomas Edison," and the second row pointer 388 of the received condition 383b contains "Thomas Edison." Referring to the fourth dataset 384, the first row pointer 386 of the sent condition 384a contains "Thomas Edison," and the second row pointer 388 of the sent condition 384a is null. The first row pointer 386 of the received condition 384b contains "Thomas Edison," and the second row pointer 388 of the received condition 384b is null.

Figure 5:
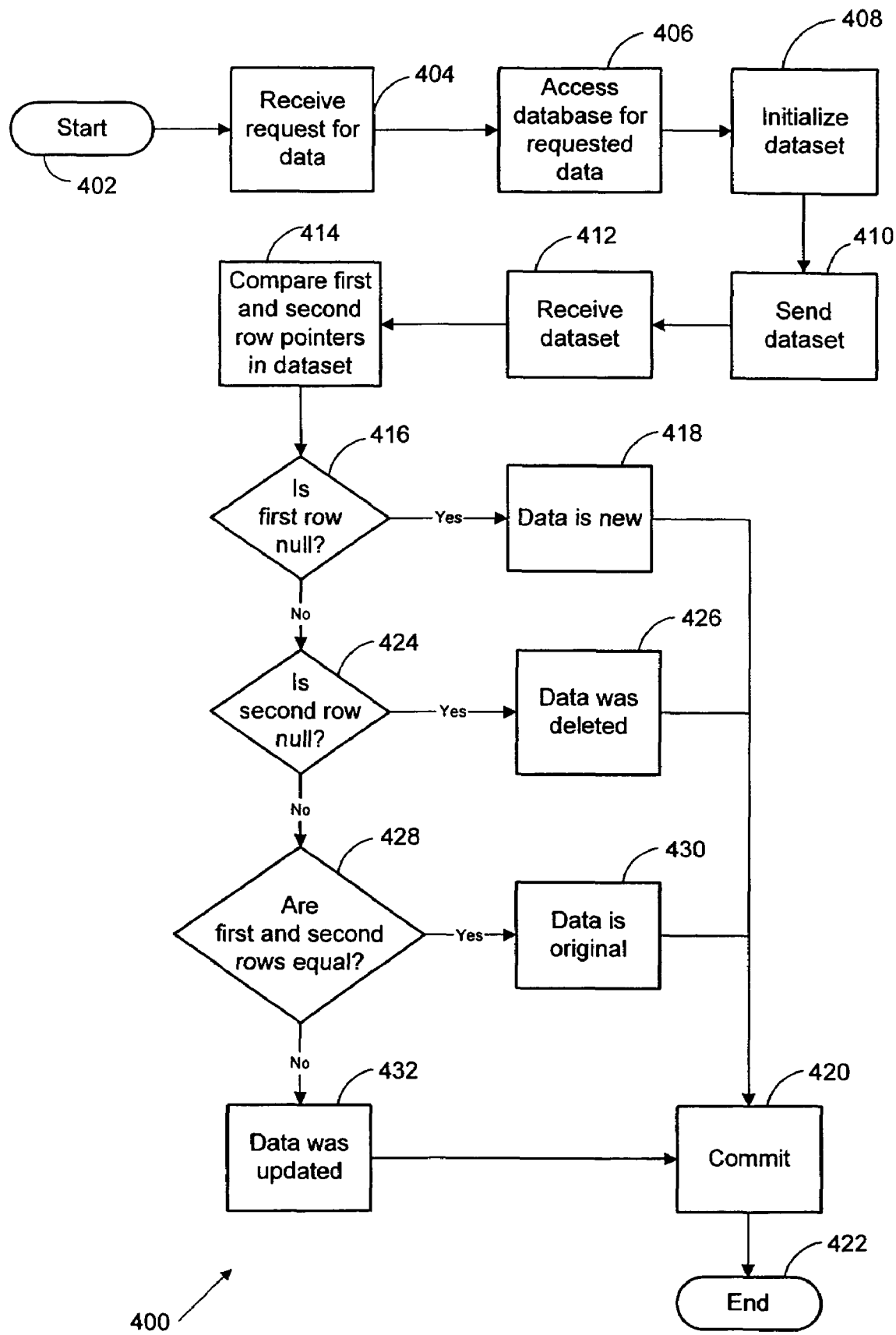
FIG. 5 is a flow chart illustrating the logical operations of the methods and systems of FIG. 1.

FIG. 5 is a flow chart representing logical operations of a disconnected data system 400 for programming disconnected data. Entrance to the operational flow of the disconnected data system 400 begins at a flow connection 402. A receive operation 404 receives a request from a client, for example the client computing system 208 of FIG. 2, for data. An access operation 406 access the database, for example the database 226 of FIG. 2, to retrieve the requested data. An initialize operation 408 initializes a dataset with the retrieved data. It is noted that typically, the retrieved data is only a copy, or snapshot, of the actual data in the database. The initialize operation 408 places the data in the first row pointer of the dataset, such as the first row pointer 386 of the first dataset 381 of FIG. 4.

A send operation 410 sends the dataset to the client for use by the client. The client can then view, manipulate, or edit the dataset. A receive operation 412 receives the dataset from the client. For example, the client might add new data, update the data, or delete the data. A compare operation 414 compares the first row pointer, the initialized or original data, to the second row pointer, the current data. In other words, the compare operation 414 is getting the changes, i.e. the deletes, modifies, and inserts by the client, out of the dataset. That is, the compare operation 414 is pulling the information out of the second row pointer, such as the second row pointer 388 of FIG. 3. A first null module 416 detects whether the first row is null, or empty. If the first null module detects that the first row is null, operational flow branches "YES" to a new operation 418. The new operation 418 declares the data as new data. Operational flow branches to a commit operation 420. The commit operation 420 will be discussed in more detail below. Operational flow ends at termination point 422.

Referring back to the first null module 416, if the first null module 416 detects that the first row is not null, operational flow branches "NO" to the second null module 424. The second null module 424 detects whether the second row pointer is null. If the second null module 424 detects that the second row pointer is null, operational flow branches "YES" to a deleted operation 426. The deleted operation 426 declares the data as deleted data. Operational flow branches to the commit operation 420, and operational flow proceeds as previously discussed.

Referring back to the second null module 424, if the second null module 424 detects that the second row is not null, operational flow branches "NO" to an equal module 428. The equal module 428 detects whether the first and second row pointers are equal. If the equal module 428 detects that the first and second row pointers are equal, operational flow branches "YES" to an original module 430. The original module 430 declares the data as original data. Operational flow branches to the commit operation 420, and operational flow proceeds as previously discussed.

Referring back to the equal module 428, if the equal module 428 detects that the first and second rows are not equal, operational flow branches "NO" to an updated module 432. The updated module 432 declares the data as updated data.

Operational flow branches to the commit operation 420, and operational flow proceeds as previously discussed.

The operational flow chart depicted in FIG. 5 Say best be understood in terms of application examples. Referring to FIGS. 2, 4, and 5, in a first application example, the first client computing system 208 of the client tier 202, FIG. 2, wants to know the name of a customer having a certain customer identification number (ID). The receive operation 404 receives the request for the customer name from the first client computing system 208. The access operation 406 accesses the database, for example the database 226 of the database tier 206, FIG. 2, for the name of the customer. The initialize operation 408 initializes the first dataset 381, FIG. 3, as represented in the sent condition 381a. Because this customer does not exist yet, the first and second row pointers 386, 388 of the first dataset 381 of the sent condition 381a are null.

The send operation 410 sends the first dataset 381 to the first client computing system 208. The first client computing system 208 decides to add a new customer, Tom Edison, to the database 226, FIG. 2. The received condition 381b represents the first dataset 381 as modified by the first client computing system 208. The first row pointer 386 of the received condition 381b of the first dataset 381 remains null reflecting the data as initialized by the initialize operation 408. The second row pointer 388 of the received condition 381b of the first dataset 381 now contains "Tom Edison," as modified by the first client computing system 208. The receive operation 412 receives the first dataset 381 from the first client computing system 208.

The compare operation 414 compares the first row pointer 386 to the second row pointer 388 of the received condition 381b of the first dataset 381. The first null module 416 detects whether the first row pointer 386 of the received condition 381b of the first dataset 381 is null. The first null module 446 detects that the first row pointer 386 of the received condition 381b is null. Operational flow branches "YES" to the new operation 418. The new operation 418 declares the data as new data and operational flow proceeds to the commit operation 420. The commit operation 420 will be described in more detail below.

In a second example application, the first client computing system 208 requests the name of the customer having the ID and operational flow proceeds as described above to the initialize operation 408. The initialize operation 408 initializes the dataset as illustrated in the sent condition 382a of the second dataset 382. The sent condition 382a of the second dataset 382 contains "Tom Edison" in the first row pointer 386 and nothing in the second row pointer 388. The send operation 410 sends the second dataset 382 to the first client computing system 208.

The first client computing system 208 changes the name from "Tom Edison" to "Thomas Edison." The revised second dataset 382 is represented as the received condition 382b of the second dataset 382. The received condition 382b of the second dataset 382 includes "Tom Edison" in the first row pointer 386 and "Thomas Edison" in the second row pointer 388. The first client computing system 208 cannot make changes to the first row pointer 386. Instead, the first row pointer 386 maintains a record of what was sent the first client computing system 208 by the server tier 204. The changes the first client computing system 208 makes to the data is placed in the second row pointer 388 only.

The receive operation 412 receives the second dataset 382 from the first client computing system 208. The compare operation 414 compares the first row pointer 386 to the second row pointer 388 of the received condition 382b of the second dataset 382. The first null module 416 detects that the first row pointer 386 of the received condition 382b is not null, and operational flow branches "NO" to the second null module 424. The second null module 424 detects that the second row pointer 388 of the received condition 382b is also not null, and operational flow branches to the equal module 428. The equal module 428 detects that the first and second row pointers 386, 388 of the received condition 382b of the second dataset 382 are not equal, and operational flow branches "NO" to the updated operation 432. The updated operation 432 declares the data as updated data.

In a third application example, the first client computing system 208 requests the name of the customer having the ID and operational flow proceeds as described above to the initialize operation 408. The initialize operation 408 initializes the dataset as represented in the sent condition 383a of the third dataset 383. The sent condition 383a of the third dataset 383 contains "Thomas Edison" in the first row pointer 386 and nothing in the second row pointer 388. The send operation 410 sends the third dataset 383 to the first client computing system 208.

The first client computing system 208 does not sake any changes to the third dataset 383. The received condition 383b of the third dataset 383 represents the third dataset 383 received from the first client computing system 208. The first row pointer 386 of the received condition 383b contains "Thomas Edison," and the second row pointer 388 of the received condition 383b contains "Thomas Edison." Operational flow proceeds as described above to the equal module 428. The equal module 428 detects that the first and second row pointers 386, 388 of the received condition 383b of the third dataset 383 are equal. Operational flow branches "YES" to the original module 430. The original module 430 declares the data as original data and operational flow proceeds as described above.

In a fourth application example, the first client computing system 208 requests the name of the customer having the ID and operational flow proceeds as described above to the initialize operation 408. The initialize operation 408 initializes the fourth dataset 384 as represented in the sent condition 384a of the fourth dataset 384. The sent condition 384a of the fourth dataset 384 contains "Thomas Edison" in the first row pointer 386 and nothing in the second row pointer 388. The send operation 410 sends the fourth dataset 384 to the first client computing system 208.

The first client computing system 208 deletes the customer name. The received condition 384b of the fourth dataset 384 represents this example embodiment. The first row pointer 386 of the received condition 384b of the fourth dataset 384 contains "Thomas Edison," and the second row pointer 388 of the received condition 384b is null. Operational flow proceeds as described above to the second null module 424. The second null module 424 detects that the second row pointer 388 of the received condition 384b of the fourth dataset 384 is null. The deleted operation 426 declares the data as deleted data, and operational flow proceeds as described above.

Figure 6:
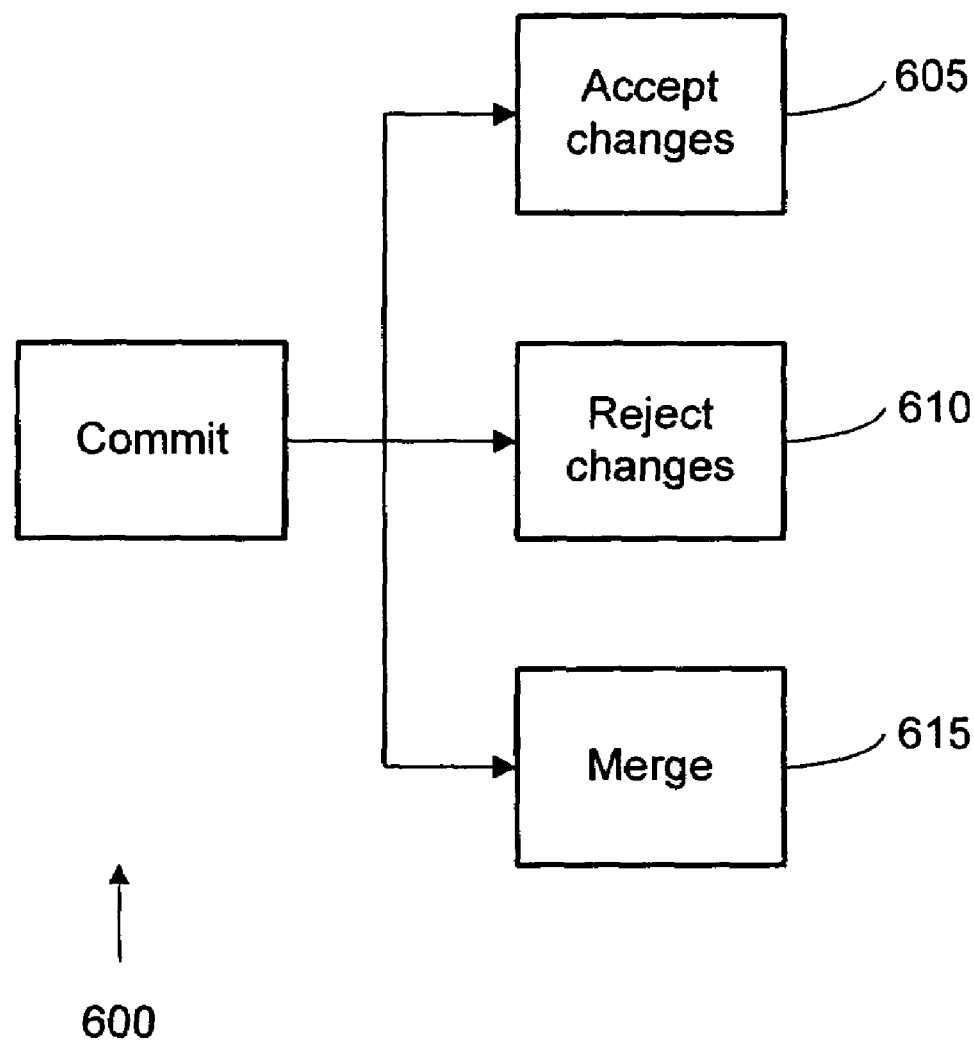
FIG. 6 is a schematic representation of a commit model, according to an example embodiment of the present invention.

Referring back to the commit module 420 of FIG. 5, a more detailed, schematic representation of the commit model 600 is illustrated in FIG. 6. It is meant by the term "commit" that changed data is analyzed and the database is updated with the changed data. Preferably three methods of committing are used, including an accept changes model 605, a reject changes model 610, and a merge changes model 615.

Preferably, adapters are used to move batches of data to and from the database. The adapters are designed to be database specific. Thus, when different types of databases are utilized, only the adapter needs to be modified rather than the system 400 illustrated in FIG. 5. In general, the adapters include a fill method and an update method. The fill method is the method previously described in connection with the initialize operation 408. The fill method includes filling the first row pointer of the dataset with the data from the database. The update method is the method described in connection with the commit model. The update method updates the data in the database with the changes received in the second row pointer of the dataset and updates the dataset, or in other words, moves the second row pointer to the first row pointer.

Typically, the accept changes model 605 moves the data in the second row pointers to the first row pointers and correspondingly updates the data in the database. It is noted that the accept changes model 605 can be used on either the entire dataset or a portion of the dataset. The reject changes model 610 is a rollback method. The second row pointers are cleared and the first row pointers remain as initialized. In other words, the changes made by the client are rejected and the database is not updated. It is noted that the reject changes model 610 can be used on either the entire dataset or a portion of the dataset.

The merge changes model 615 merges changes between different datasets and the database. For example, two different client computing systems might be modifying the same data. The merge changes model 615 merges the data between the different datasets from different client computing systems. As mentioned earlier, several client computing systems 202, FIG. 2, might be communicating with the server tier 204, FIG. 2, at the same time. Each client computing system is sent a dataset as described previously. Different client computing systems 202 might be modifying the same data in their respective datasets at the same time. The merge changes model 615 determines how to merge this data and update the database.

Referring to FIG. 3, the first dataset 381 includes a table 390 comprising rows 391 of data. For example, "Tom Edison" is a row 391 in the table 390 of the first dataset 381. Whenever a row 391 is added to the dataset 381, the row 391 is assigned a locally unique identifier (LUID) 392, for example "1." The merge method uses these LUIDs to match the data in the datasets. For rows 391 that match, the original and current values of the row pointers are replaced by the incoming row pointers. For unmatched incoming row pointers, a new row is added to the existing dataset with the incoming values added. Constraint checking can also be used to preserve data integrity.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of tracking data, the method comprising:
   receiving a request from a client computing system for data from a database;
   initializing a first row pointer of a dataset with the data from the database requested by the client computing system in response to the request by the client computing system;
   sending the initialized dataset to the client computing system;
   placing changes to the data by the client computing system in a second row pointer of the dataset;
   receiving the dataset with the changes;
   comparing the first and second row pointers; and
   declaring a state of the data in response to comparing the first and second row pointers, including:
      declaring the data to be original data in response to detecting the first and second row pointer to be equal; and
      declaring the data to be updated data in response to detecting the first and second row pointers to not be equal.

2. A method according to claim 1, wherein the step of comparing includes detecting whether the first row pointer is null, and if the first row pointer is null, declaring the data to be new data in response to detecting the first row pointer to be null.

3. A method according to claim 1, wherein the step of comparing includes detecting whether the second row pointer is null, and if the second row pointer is null, declaring the data to be deleted data in response to detecting the second row pointer to be null.

4. A method according to claim 1, further comprising committing the data in the second row pointer.

5. A method according to claim 4, wherein the step of committing includes accepting, rejecting, or merging the data.

6. A method according to claim 5, wherein merging includes merging a plurality of datasets from a plurality of client computing systems.

7. A method according to claim 6, wherein the step of merging includes matching locally unique identifiers between rows of the plurality of datasets.

8. A method according to claim 4, wherein the step of committing includes updating the database with the data in the second row pointer.

9. A computer program product readable by a computing system and encoding instructions for a computer process for tracking data, the computer process comprising:
   receiving a request from a client computing system for data from a database;
   initializing a first row pointer of a dataset with the data from the database requested by the client computing system in response to the request by the client computing system;
   sending the initialized dataset to the client computing system;
   placing changes to the data by the client computing system in a second row pointer of the dataset;
   receiving the dataset with the changes;
   comparing the first and second row pointers; and
   declaring a state of the data in response to comparing the first and second row pointers, including:
      declaring the data to be new data in response to detecting the first row pointer to be null; and
      declaring the data to be deleted data in response to detecting the second row pointer to be null.

10. A computer program product according to claim 9, wherein the step of comparing includes detecting whether the first and second row pointers are equal, and if the first and second row pointers are equal, declaring the data to be original data in response to detecting the first and second row pointers to be equal.

11. A computer program product according to claim 9, wherein the step of comparing includes detecting whether the first and second row pointers are equal, and if the first and second row pointers are not equal, declaring the data to be updated data in response to detecting the first and second row pointers to not be equal.

12. A system for tracking data, the system comprising:
   a receive module that receives a request from a client computing system for data from a database;
   an initialize module that initializes a first row pointer of a dataset with the data from the database requested by the client computing system in response to the request by the client computing system;
   a send module that sends the initialized dataset to the client computing system;
   a change module that places changes to the data by the client computing system in a second row pointer of the dataset;
   a compare module that receives the dataset with the changes and compares the first and second row pointers; and
   a declare module that declares a state of the data in response to comparing the first and second row pointers, including:
      an original module that declares the data to be original data in response to detecting the first and second row pointers to be equal; and
      an updated module that declares the data to be updated data in response to detecting the first and second row pointers to not be equal.

13. A system according to claim 12, further comprising:
   a first null module that detects whether the first row pointer is null; and
   a new module that declares the data to be new data in response to detecting the first row pointer to be null.

14. A system according to claim 12, further comprising:
   a second null module that detects whether the second row pointer is null; and
   a delete module that declares the data to be deleted data in response to detecting the second row pointer to be null.

15. A system according to claim 12, further comprising a commit module that commits the data in the second row pointer.

* * * * *